United States Patent [19]

Johnson

[11] Patent Number: 4,830,283
[45] Date of Patent: May 16, 1989

[54] IRRIGATION SYSTEM

[76] Inventor: Bradford H. Johnson, 7831 New Cut Rd., Inman, S.C. 29349

[21] Appl. No.: 61,094

[22] Filed: Jun. 10, 1987

[51] Int. Cl.$^4$ .................. B65H 75/34; B05B 15/00; B05B 15/06
[52] U.S. Cl. ........................ 239/197; 239/1; 239/547; 137/355.2; 242/86.61
[58] Field of Search ............ 239/736, 195, 198, 197, 239/542, 547; 242/86, 86.8, 86.2, 86.3, 86.61; 137/355.2, 355.16, 355.26, 355.27

[56] References Cited

U.S. PATENT DOCUMENTS

| 773,971 | 11/1904 | Thompson | 239/196 X |
| 2,566,833 | 9/1951 | Healy | 239/547 X |
| 3,653,606 | 4/1972 | Sheets | 242/868 |
| 3,899,132 | 8/1975 | Grobbelaar | 242/86 X |
| 4,306,682 | 12/1981 | Toussaint | 137/355.27 X |
| 4,582,257 | 4/1986 | Siegler | 239/197 |

FOREIGN PATENT DOCUMENTS

| 1456725 | 9/1966 | France | 239/736 |
| 2485332 | 12/1981 | France | 239/197 |
| 529320 | 6/1955 | Italy | 239/547 |
| 421329 | 12/1971 | U.S.S.R. | 239/195 |
| 739606 | 11/1955 | United Kingdom | 239/547 |

OTHER PUBLICATIONS

Sales brochure for Vinylfow All Purpose Drip Irrigation Hose by Kuriyama of America, Inc.
Sales brochure for Flo-Couplings, Inc., of Brookfield, Ill.
Sales brochure for Hardie Irrigation "Bi-Wall" 10 of James Hardie Irrigation El Cajon, Calif.
Sales brochure for Hydro Traveler, Hydro Engineering Inc. of Young America, Minnesota.

Primary Examiner—Andres Kashnikow
Assistant Examiner—Kevin P. Weldon
Attorney, Agent, or Firm—Dority & Manning

[57] ABSTRACT

An irrigation system and a method for using same is disclosed. The irrigation system includes a coated fabric irrigation conduit having diffuser openings defined therein. The irrigation conduit is pressurizable from a substantially flattened, unpressurized configuration to a substantially cylindrical, pressurized configuration. A mobile storage and dispensing device for the irrigation conduit is provided and includes a reel rotatably mounted on a frame structure for carrying the irrigation conduit. A drive unit is provided for rotating the reel along with controls for determining the direction of rotation of the reel. Coupling elements are connected to the reel for receiving coupling ends of the irrigation conduit. Also provided is a traversable irrigation conduit guide connected to the frame structure for allowing the irrigation conduit to be wound evenly about a receiving zone of the reel. Further, spaced apart transverse bars are attached to the frame structure for substantially flattening and removing water from the irrigation conduit as it is wound on the reel.

14 Claims, 4 Drawing Sheets

IRRIGATION SYSTEM

BACKGROUND OF THE INVENTION

This invention relates to an irrigation system including a mobile storage and dispensing device for a flattenable irrigation conduit.

Various methods have been used for irrigating crops. One such method involves the digging of trenches between the crops. The trenches are then flooded from a central supply, such as a river or stream, for supplying the crops with water. While such a method may prove satisfactory in certain environments, the method requires a large amount of earth to be physically moved and a nearby high volume supply of water. Also, such a method is somewhat inefficient in the even application of water to the crops.

Another method for irrigating crops includes a traveling sprinkler which is propelled through the field and which emits a high pressure stream of water for dispersal on the crops. One such traveling sprinkler is manufactured by Hydro Engineering Incorporated of Young America, Minn. Such a traveling sprinkler is relatively complex and expensive and requires for a high pressure water source, which normally involves the use of high pressure pumps. Further, the traveling sprinkler requires some means of propulsion such that the entire field may receive water. Moreover, the traveling sprinkler looses efficiency in that a substantial amount of water emitted therefrom evaporates before falling onto the crops.

Another means of irrigating crops involves the use of aluminum piping having holes therein which are placed in the rows between the crops and which emit pressurized streams of water therefrom. Such a system generally performs satisfactorily. However, it is bulky and time consuming to set up and move about and is also somewhat costly. Another type of conduit irrigating system involves the use of small diameter plastic tubing having holes therein for trickling water out to row crops. One such type of tubing is manufactured by James Hardie Irrigation of El Cajon, Calif. Such a system generally works well. However, it is relatively costly and is not readily reuseable.

SUMMARY OF THE INVENTION

The present invention recognizes and addresses such drawbacks of the prior art. Hence, it is a general object of this invention to provide a relatively lowcost, reuseable system for irrigating crops. It is also a general object of this invention to provide an irrigation system which efficiently delivers pressurized water to crops and which is simple to implement.

It is a more specific object of the present invention to provide a mobile storage and dispensing device for an irrigation conduit.

Another object of the present invention is to provide an irrigation conduit which efficiently disperses water therefrom and which is both readily put into use and readily removable from use.

Still another object of the present invention is to provide a method for irrigating crops efficiently using readily reuseable equipment.

Yet another object of the present invention is to provide an irrigation system having a mobile storage and dispensing device for a deflatable irrigation conduit.

Various combinations of presently disclosed features may be provided in a given embodiment thereof in accordance with this invention. Generally, one such exemplary embodiment of the present invention includes an irrigation system for providing pressurized irrigation fluid to crops. The irrigation system comprises irrigation conduit including a tube having a flexible wall defining an internal passage for carrying a pressurized irrigation fluid. The tube is pressurizable with the pressurized irrigation fluid to a substantially cylindrical, pressurized configuration. The wall of the tube defines a plurality of first pairs of diffuser openings, each first pair being spaced from an adjacent first pair and being offset in a circumferential direction relative thereto about said tube and a plurality of second pairs of diffuser openings, each second pair being spaced from an adjacent second pair and being offset in a circumferential direction relative thereto about said tube. The first and second pairs of diffuser openings are in communication with the internal passage for emitting pressurized fluid therefrom.

Each of the first pair of diffuser openings are substantially diametrically opposed from one another and defining a first axis therebetween when the tube is in the substantially cylindrical configuration, and each of the second pair of diffuser openings are substantially diametrically opposed from one another and defining a second axis therebetween when the tube is in the substantially pressurized configuration. The first and second axes are substantially angularly disposed with respect to one another about the circumference of the tube with respect to the pair of first diffuser openings and relative to the central axis of the tube when the tube is in the substantially cylindrical pressurized configuration.

Cooperating coupling ends are attached to the tube about the ends thereof. The coupling ends have generally cylindrical openings cooperating with the internal passage of the tube. The coupling ends allow the tube to be connected in fluid communication with a pressurized irrigation fluid source and an outlet.

Also included is a mobile storage and dispensing device for the irrigation conduit which includes a frame structure. Wheels are rotatably mounted to the frame structure for allowing the frame structure to be moved about thereon. A spool or reel is rotatably mounted to the frame structure and is adapted for carrying the irrigation conduit. The reel has a receiving zone for receiving the irrigation conduit. The reel is for rotation in a winding up direction for winding up the irrigation conduit about the receiving zone and for rotation in a paying out direction for paying out the irrigation conduit therefrom.

Drive means are associated with the reel for imparting rotation to the reel. Control means are connected to the drive means for controlling the rotation of the drive means.

Means are located on the reel outside of the receiving zone for maintaining the coupling ends of the irrigation conduit away from the receiving zone to allow the irrigation conduit to be wound generally uniformly thereat.

A traversable irrigation conduit guide associated with the frame structure is provided for allowing the irrigation conduit to be wound evenly about the receiving zone of the reel.

Irrigation conduit flattening means are associated with the frame structure between the traversable irrigation conduit guide means and the reel, the irrigation conduit flattening means being configured to contact opposing sides of the irrigation conduit for substantially flattening same as it is being wound on the reel.

Another aspect of the present invention includes a method of irrigating crops. The method includes providing a coated fabric irrigation tube and drilling at least one first pair of diametrically opposed diffuser openings into and in communication with a pressurized fluid passage of the coated fabric irrigation tube with a drill bit, such that the fabric of the coated fabric irrigation tube frays at and extends into the first pair of diffuser openings for allowing pressurized fluid to be diffusedly emitted therethrough. The method also includes drilling at least one second pair of diametrically opposed diffuser openings spaced from and substantially perpendicularly out of alignment with the first pair of diffuser openings into and in communication with the pressurized fluid passage of the coated fabric irrigation tube with a drill bit, such that the fabric of the coated fabric irrigation tube frays at and extends into the second pair of diffuser openings for allowing pressurized fluid to be diffusedly emitted therethrough.

The method further includes connecting the internal passage of the coated fabric irrigation tube with a supply of pressurized irrigation water and positioning the coated fabric irrigation tube such that the pairs of first and second diffuser openings emit oppositely angled streams of diffused irrigation fluid therefrom at substantially opposite angles with respect to the ground. After a predetermined amount of time, the method entails disconnecting the internal passage of the coated fabric irrigation tube from the supply of pressurized irrigation water. Removal of irrigation water from and flattening of the coated fabric irrigation tube after disconnection from the supply of pressurized irrigation water is performed simultaneously through contact of the coated fabric irrigation tube with coated fabric irrigation tube flattening means, while winding up the coated fabric irrigation tube on a reel of a storage and dispensing device.

BRIEF DESCRIPTION OF THE DRAWINGS

The foregoing as well as other objects of the present invention will be more apparent from the following detailed description of a preferred embodiment of the invention, including the best mode thereof, when taken together with the accompanying drawings, in which.

DESCRIPTION OF THE PREFERRED EMBODIMENT

Figure 1:
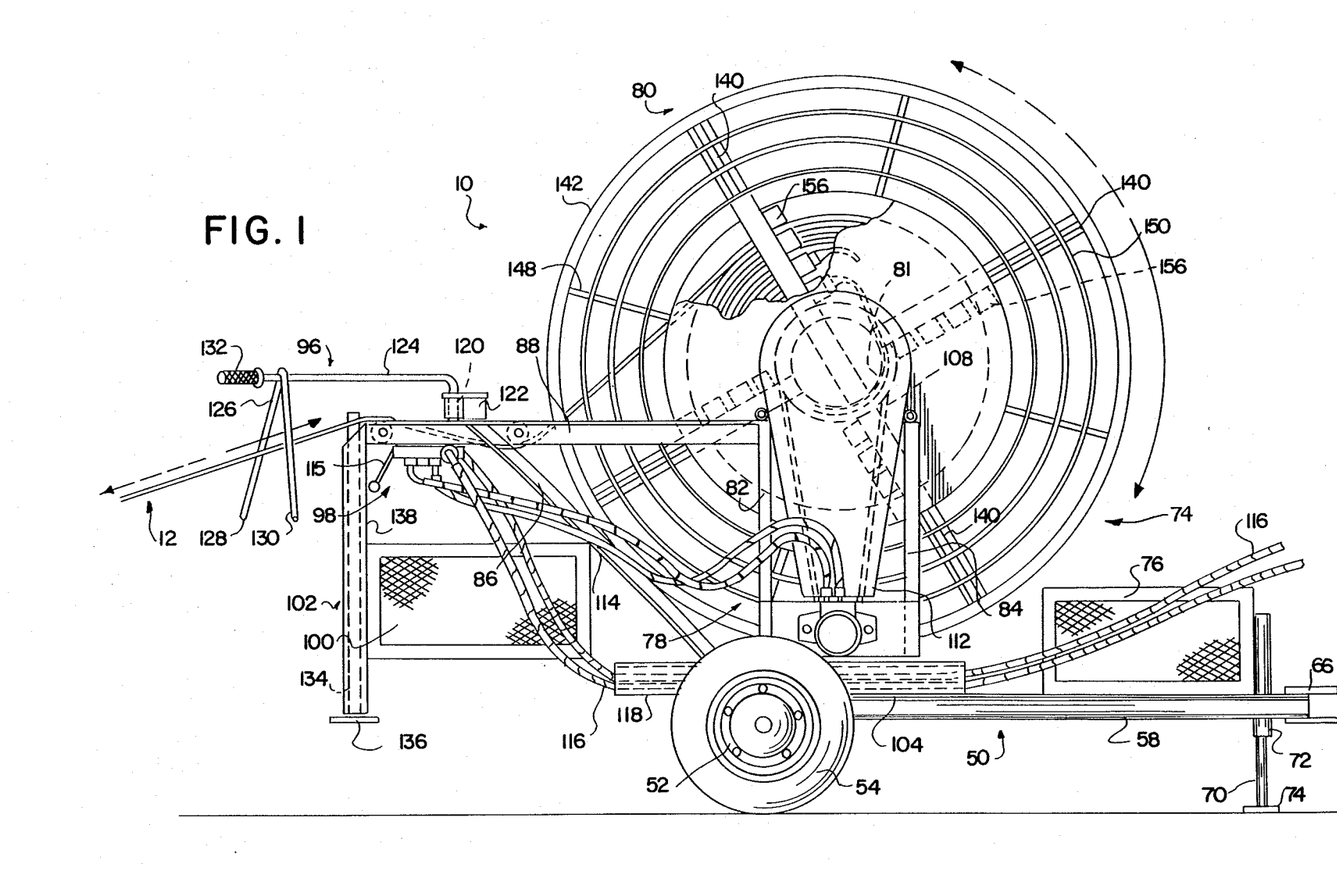
FIG. 1 is a side elevational view of irrigation conduit and a mobile storage and dispensing device therefor constructed in accordance with the present invention.

Referring to the drawings in detail, wherein like reference characters represent like elements and/or features throughout the various views, the irrigation system of the present invention is designated generally in FIG. 1 by the reference character 10. Irrigation system 10 includes irrigation conduit, generally 12, and a mobile storage and dispensing device therefore, generally 14.

Figure 4:
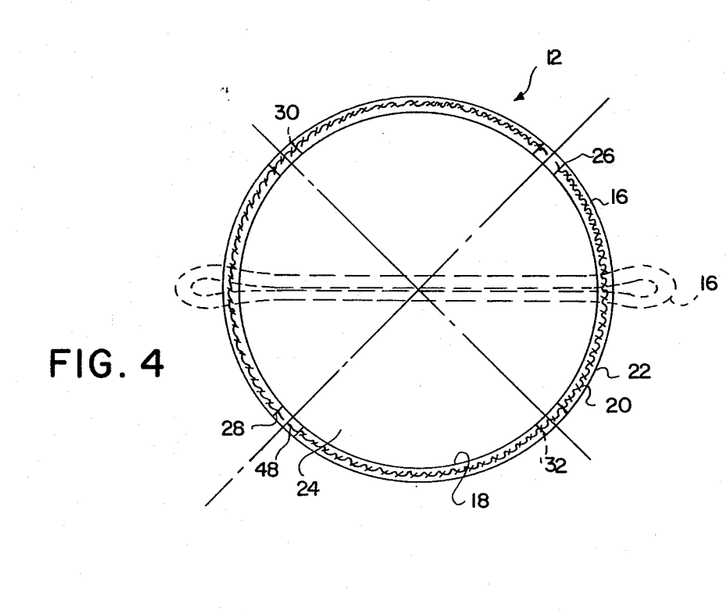
FIG. 4 is a sectional view of an irrigation conduit constructed in accordance with the present invention.
Figure 5:
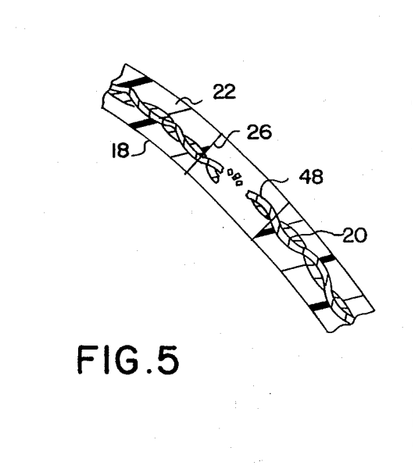
FIG. 5 is an enlarged sectional view of an irrigation conduit diffuser opening constructed in accordance with the present invention.

As illustrated in FIGS. 4 and 5, irrigation conduit 12 includes a tube 16 having an inner wall 18 and an outer fabric wall 20 having a coated outer surface wall 22. One such tube such as tube 16 is "Vinylflow All Purpose Drip Irrigation Hose", manufactured by Kuriyama of America, Incorporated.

Tube 16 includes an internal passage 24 for carrying a pressurized fluid such as irrigation water. Tube 16 is pressurizable with pressurized irrigation water from a substantially flattened, unpressurized configuration, as shown in FIG. 1 and in phantom in FIG. 4, to a substantially cylindrical pressurized configuration, as shown in FIGS. 3 and 4.

Tube 16 includes diffuser openings 26, 28, 30, 32, through the walls 18, 20, 22 thereof. Diffuser openings 26, 28, 30, 32 are in fluid communication with internal passage 24 of tube 16 for allowing pressurized irrigation water to be emitted from internal passage 24 through diffuser openings 26, 28, 30, 32. As shown in FIGS. 3 and 4, diffuser openings 26 and 28 are diametrically opposed from one another, and diffuser openings 30 and 32 are also diametrically opposed from one another, when tube 16 is in its substantially cylindrical pressurized configuration. Diffuser openings 30, 32 are spaced a predetermined distance along the length of tube 16 from diffuser openings 26, 28, the predetermined distance of 4 feet being found particularly advantageous for use of irrigation system 10 in peach orchards. However, the predetermined distance along the length of tube 16 between diffuser openings 26, 28 and 30, 32 could be readily varied depending on the crops with which irrigation system 10 is used and on the condition or desired results which are to be achieved. Diffuser openings 28, 30 are illustrated in FIG. 3 as not emitting fluid for purposes of clarity only.

Diffuser openings 26, 28, 30, 32 are preferably approximately 9/64 inches in diameter when irrigation system 10 is to be used for irrigating peach orchards. However, it is to be understood that the size of diffuser openings 26, 28, 30, 32 could be varied from application to application and it is not limited to one particular dimension.

Figure 3:
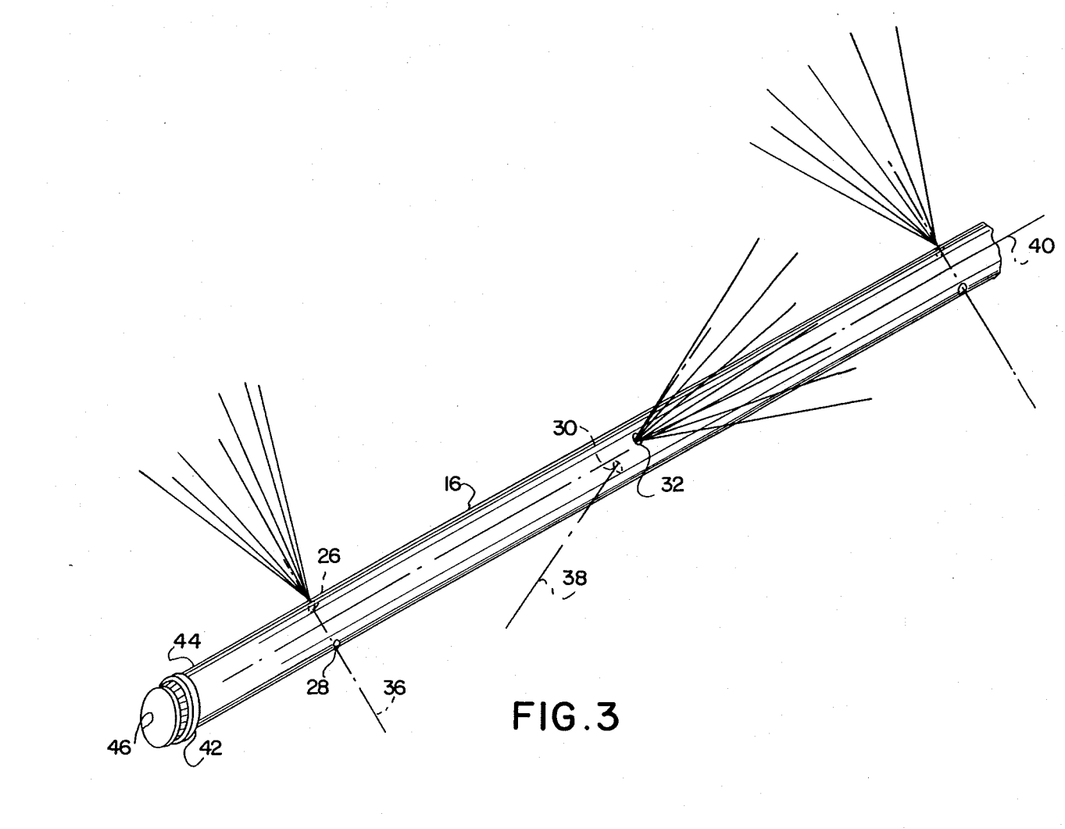
FIG. 3 is a partial perspective view of an irrigation conduit constructed in accordance with the present invention.

As illustrated in FIG. 3, an axes 36 between diffuser openings 26, 28 is substantially perpendicular to an axis 38 between diffuser openings 30, 32. Axes 36, 38 also extend substantially perpendicular to and intersect with longitudinal axis 40 of tube 16 when tube 16 is in its substantially cylindrical, pressurized state.

Cooperating coupling ends 42 are attached to tube 16 about the ends 44 thereof. Coupling ends 42 have a generally cylindrical opening 46 which is in communication with internal passage 24 of tube 16. Coupling ends 42 are fixedly attached to tube 16 by conventional means such as by clamps, clips, or the like (not shown) and allow for tube 16 to be connected to other tubes 16 or to a pressurized fluid source such as a pump (not shown) or drain (not shown). One such suitable type of coupling end 42 is manufactured by Flo-Couplings, Incorporated of Brookfield, Ill.

Diffuser openings 26, 28, 30, 32 are preferably defined in tube 16 by drilling. A drill bit having dulled spiral flutes (not shown) is preferably used for piercing tube 16 to cause fabric wall 20 to fray at the diffuser openings 26, 28, 30, 32 and extend inwardly therein, as shown by frayed ends 48 in FIGS. 4 and 5. In providing tube 16 with diffuser opening 26, 28, 30, 32, the two opposing diffuser openings 26, 28 are simply drilled simultaneously with one pass of the drill bit when tube 16 is in a flattened, unpressurized state. Diffuser openings 30, 32 are drilled likewise in tube 16, however, at a predetermined distance away from diffuser openings 26, 28 and about an axis 38 substantially perpendicular to the axis 36 between diffuser openings 26, 28. Frayed ends 48 cause diffusion of the pressurized water emitted from internal passage 24 through diffuser openings 26, 28, 30, 32 such that a fine mist stream issues outwardly from tube 16. The fine mist spray allows for efficient water dispersion to the crops adjacent tube 16 in a gentle, soil conserving manner. While frayed ends 48 are preferably used to diffuse the water, various other obstructions could be provided diffuser openings 26, 28, 30, 32 for diffusing the water.

Figure 2:
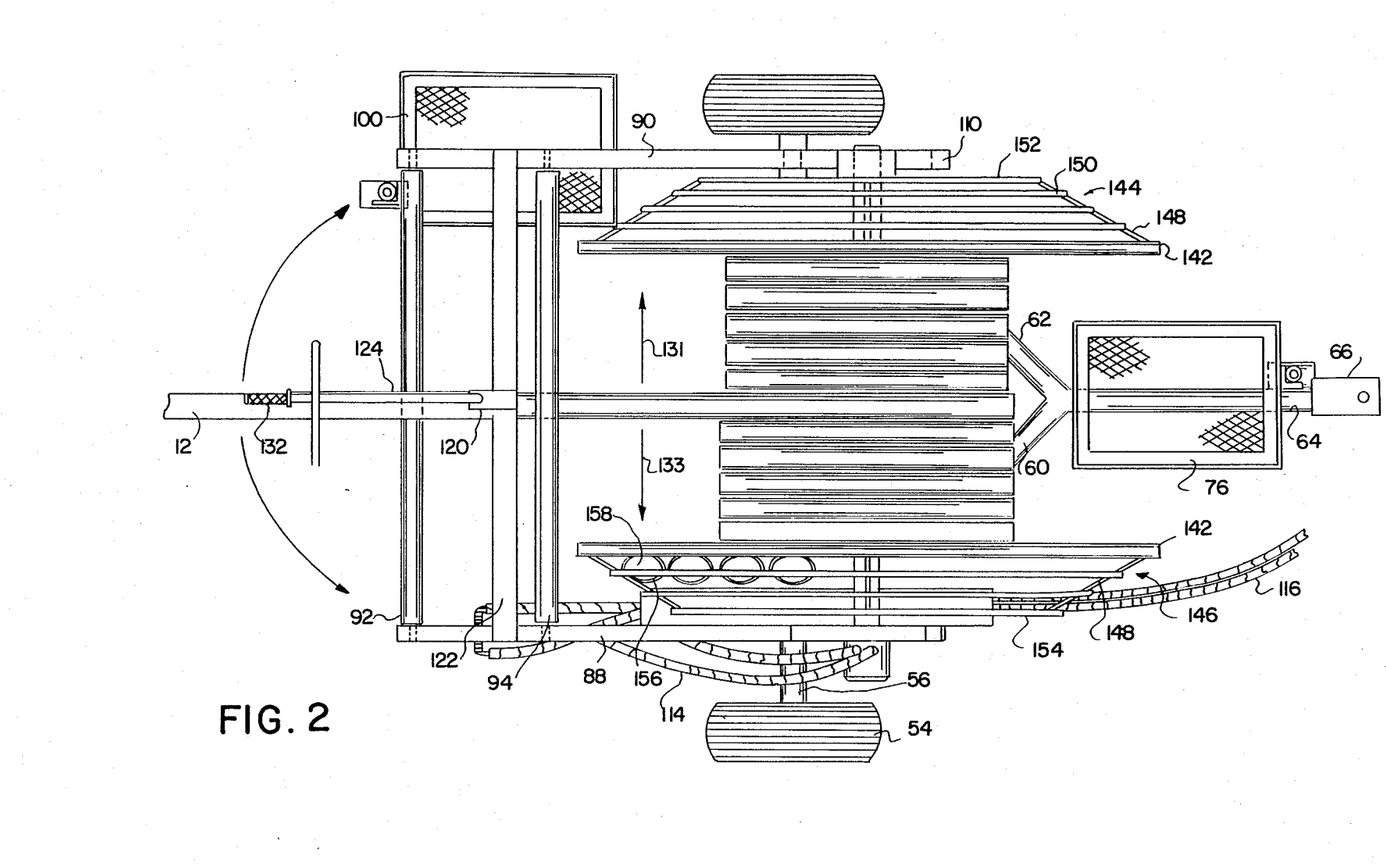
FIG. 2 is a plan view of irrigation conduit and a mobile storage and dispensing device therefor constructed in accordance with the present invention.

Now turning to FIGS. 1 and 2, mobile storage and dispensing device 14 will be defined in detail. Mobile storage and dispensing device 14 includes a frame structure, generally 50, having wheels 52 rotatably mounted thereon for allowing frame structure 50 to be readily moved about. Wheels 52 include tires 54 connected thereto. Wheels 52 are rotatably connected to transverse axle frame member 56 shown in FIG. 2. Axle frame member 56 is connected to a drawbar structure 58 having inwardly angled members 60, 62 which terminate in a drawbar 64. Drawbar 64 includes a coupling 66 attached thereto for allowing mobile storage and dispensing device to be pivotally connected to the drawbar of a tractor, truck, or the like (not shown). Extending downwardly from drawbar 64 is an adjustable stand 68 having a substantially vertical shaft 70 movable within a sleeve 72. A foot member 74 is connected to shaft 70 for contact with the ground. Shaft 70 is movable within sleeve 72 and is fixable thereto for allowing drawbar structure 58 to be supported above the ground when not connected to the tractor or other towing device. A utility storage box 76 is provided on drawbar structure for holding tools, connectors, equipment or the like.

Extending up from axle frame member 56 is a reel supporting frame structure 78 for supporting a rotatable spool or reel 80. Reel support structure 78 includes vertical frame members 82, 84, and extending therefrom in a rearward direction are two frame members 86 (only one shown) and frame members 88, 90 for supporting spaced apart transverse bars 92, 94, oscillating or traversable conduit guide, generally 96, control valve means, generally 98, utility storage box 100, and rearward stand generally 102.

A hydraulic motor 104 is attached to a mounting plate 106 mounted between vertical frame members 82, 84. Hydraulic motor 104 is connected by a drive member 108 such as a belt or chain, which is connected to a pulley or sprocket fixedly connected to the axle 110 of reel 80, such that upon rotation of hydraulic motor 104, reel 80 also rotates therewith under the influence of drive member 108. A safety shroud 112 covers drive member 108.

Hydraulic motor 104 is reversible such that the rotation of reel 80 is also reversible. Hydraulic motor 104 is connected to control valve means 98 by hoses 114 such that manipulation of a handle 115 of control valve 98 allows for the rotation of hydraulic motor 104 to be rotated in two directions, or idled if desired. Hoses 116 are connected to a hydraulic power source of a tractor or the like and are connected to a control valve means 98 for supplying pressurized hydraulic fluid to hydraulic motor 104. A conduit 118 is provided for allowing the passage therethrough of hoses 116 for protecting same.

Oscillating or traversable conduit guide 96 is pivotally mounted by pivotal connector 120 to a transverse member 122 which extends in the vicinity of spaced apart transverse bars 92, 94. Traversable conduit guide 96 includes a lever 124 having an inverted V-shaped hose guide 126, having legs 128, 130, for guiding irrigation conduit 12 evenly about an irrigation conduit receiving area of reel 80 in the direction of arrows 131, 133. A handle 132 is provided traversable conduit guide 96 for allowing manual movement thereof in the even distribution of irrigation conduit 12 about the irrigation conduit receiving zone of reel 80 during winding up of irrigation conduit 12 thereon.

Spaced apart transverse bars 92, 94 serve to contact opposing sides of irrigation conduit 12 as it is being wound onto reel 80, as shown in FIG. 1. The contact of transverse bars 92, 94 with the irrigation conduit 12 simultaneously causes the flattening and substantial elimination of water from irrigation conduit 12 as it is being wound up. Because irrigation conduit 12 is flattened prior to being placed on reel 80, it is less bulky, thereby allowing for a large amount of irrigation conduit 12 to be wound on a reel 80 of moderate size. Irrigation conduit 12 slides transversely along transverse bars 92, 94 as it is being both wound onto reel 80 and oscillated by transversable conduit guide 96.

Rearward stand 102 is constructed similarly as stand 68, having a shaft 134 with a foot member 136 thereon for contacting the ground. Shaft 134 is slidably received in a sleeve 138 of rearward stand 102 and is fixable with respect to sleeve 138 at varying heights for providing stationary support to mobile storage and dispensing device 14.

Reel 80 includes end frame members 140 extending radially outward from axle 110 and defining the irrigation conduit receiving zone therebetween.

Reel 80 includes central spool means 81, such as transverse rods (not shown), between end frame members for also defining the irrigation conduit receiving zone in which irrigation conduit 12 is evenly wound about upon the traversing of transversable conduit guide 96. End frame members 140 terminate in rims 142. Extending outwardly from rims 142 are frusto-conical housings 144, 146 which include angled support members 148 and ring members 150 connected thereto. Frusto-conical structures 144, 146 are capped by disc plates 152, 154. Frusto-conical structures 144, 146 are fixedly attached to reel 80 for rotation therewith. Attached to end frame members 144 substantially within frusto conical structures 144, 146 are coupling ends attachment sleeves 156 for receiving the openings 46 of coupling ends 42 of irrigation conduit 12 through an interference fit therebetween. Upon winding up of an individual conduit 12, a coupling end 42 thereof is fitted between transverse bars 92, 94 and connected to an attachment sleeve 156. Such fixes the end of the irrigation conduit with respect to reel 80 so that upon rotation of reel 80, the irrigation conduit 12 will be wound thereon. Also, because attachment sleeves 156 are provided with a central opening 158, water which may happen to remain in irrigation conduit 12 may freely pass through the coupling end 142 and out of opening 158 of the attachment sleeve 156.

After the irrigation conduit 12 has been wound on reel 80, the other coupling end 42 can then be attached to another attachment sleeve 156. This allows the irrigation conduit 12 to be securely retained on reel 80 in that it is prevented from unraveling therefrom. Also, the placement of attachment sleeves 156 within the frustoconical structures 144, 146 allows for coupling ends 42 to be placed outside of the irrigation conduit receiving zone of reel 80. This allows for irrigation conduits 12 to be wound smoothly about the irrigation conduit receiving zone of spool 80 without lumps or ridges, which would be caused if coupling ends 42 were also wound up in the irrigation conduit receiving zone of reel 8.

In the embodiment of the present invention illustrated in FIG. 1, sixteen attachment sleeves 156 are provided. As two attachment sleeves 156 are necessary for receiving the two coupling ends 42 of each irrigation hose 12 wound on reel 80, the embodiment of FIG. 1 could securely hold at least eight irrigation conduits 12. It is to be understood, however, that the present invention is not to be limited to a device for holding eight irrigation conduits, but could be configured to hold any reasonable number of irrigation conduits 12 with the corresponding addition or deletion of attachment sleeves 156.

In operating irrigation system 10 of the present invention, mobile storage and dispensing device 14 is drawn to the beginning of an aisle between rows of crops. A coupling end 42 of an irrigation conduit 12 is removed from an attachment sleeve 156 and is connected to a pressurized irrigation water supply source. Handle 115 of control valve means 98 is then moved such that reel 80 is in an idled position, whereby the forward movement of mobile storage and dispensing device 14 causes reel 80 to rotate in a paying out direction. Meanwhile, irrigation conduit 12 pays out from reel 80 as reel 80 rotates in a paying out direction. Successive irrigation conduits 12 are connected to the first irrigation conduit 12 in like manner with coupling ends 42 until the length of the aisle is accommodated by irrigation conduit 12. Then, the end of irrigation conduit 12 opposite the end connected to the pressurized irrigation water source is capped. Pressurized water is then supplied the irrigation conduit such that diffused streams of irrigation water flow outwardly from diffuser openings 26, 28, 30, 32 for watering adjacent crops.

Upon satisfactory watering of the crops, the supply of pressurized water to irrigation conduit 12 is cut off, and coupling ends 42 are disconnected from one another and from the pressurized water supply source to allow drainage from irrigation conduit 12. Reel 80 is brought to the aisle adjacent the end of irrigation conduit 12. The coupling end 42 of the extreme end of the irrigation conduit 12 is then threaded between legs 128, 130 of hose guide 126, over and under transverse bars 92, 94, and connected to an attachment sleeve 156. Handle 115 of control valve means 98 is then actuated for rotating reel 80 in a winding up direction, which begins to wind the irrigation conduit thereon. During winding, transversable conduit guide 96 is oscillated back and forth as illustrated in FIG. 2 about the lengths of transverse bars 92, 94 such that the irrigation conduit is evenly wound about the irrigation conduit receiving zone of reel 80. Simultaneously, transverse bars 92, 94 flatten and remove water from the irrigation conduit 12 being wound on reel 80. After the length of the irrigation conduit 12 has been wound on reel 80, the second coupling end 42 of the irrigation conduit is hooked to an attachment sleeve 156 such that irrigation conduit 12 is retained on reel 80. The remaining irrigation conduits 12 are wound onto reel 80 in like manner.

As can be seen from the foregoing, the irrigation system of the present invention provides a means for economically and efficiently irrigating crops in a simple and versatile manner.

While one preferred embodiment of the invention has been described using specific terms, such description is for illustrative purposes only, and it is to be understood that changes and variations to such embodiment, including but not limited to the substitution of equivalent features or parts, and the reversal of various features thereof, may be practiced by those of ordinary skill in the art without departing from the spirit or scope of the following claims.

What is claimed is:

1. A mobile storage and dispensing device for at least one irrigation hose, the irrigation hose having coupling ends, each coupling end having an opening, the mobile storage and dispensing device comprising:
   a frame structure;
   wheels rotatably mounted to said frame structure for allowing said frame structure to be moved about thereon;
   a reel rotatably mounted on said frame structure and adapted for carrying at least one irrigation hose, said reel having a receiving zone for receiving irrigation hose, said reel being for rotation in a winding up direction for winding up an irrigation hose about said receiving zone and for rotation in a paying out direction for paying out an irrigation hose therefrom;
   drive means associated with said reel for imparting a rotation to said reel; and
   means located on said reel outside of said receiving zone for maintaining the coupling ends of the irrigation hose away from said receiving zone to allow irrigation hose to be wound generally thereabout, said means including projection members connected to said reel for receiving the coupling ends of an irrigation hose.

2. A mobile storage and dispensing device as defined in claim 1, further comprising
   a traversable irrigation hose guide associated with said frame structure for allowing an irrigation hose to be wound laterally about said receiving zone of said reel in a substantially uniform manner.

3. A mobile storage and dispensing device as defined in claim 1, further comprising:
   irrigation hose flattening means associated with said frame structure for contacting opposing sides of an irrigation hose for substantially flattening same as it is being wound onto said receiving zone of said reel.

4. A mobile storage and dispensing device as defined in claim 1, further comprising:
   control means connected to said drive means for controlling said drive means.

5. A mobile storage and dispensing device as defined in claim 1, wherein said reel includes end members adjacent said receiving zone and wherein said coupling attachment means include substantially cylindrical sleeves connected to at least one of said end members and adapted for receiving generally cylindrical openings of coupling ends of an irrigation hose.

6. A mobile storage and dispensing device as defined in claim 1, wherein said drive means is a reversible hydraulic motor.

7. A mobile storage and dispensing device as defined in claim 2, wherein said traversable guide means includes:
   a lever pivotally mounted to said stationary support frame for pivoting to and from about said receiving zone; and
   an irrigation hose guide extending downwardly from said lever, said irrigation hose guide having two legs and being of a generally inverted V-shape, said two legs being configured for guiding an irrigation hose therebetween when the irrigation hose is being wound on said reel.

8. A mobile storage and dispensing device for at least one irrigation hose, the irrigation hose having coupling ends, each coupling end having an opening, the mobile storage and dispensing device comprising:
   a frame structure;
   wheels rotatably mounted to said frame structure for allowing said frame structure to be moved about thereon;
   a reel rotatably mounted on said frame structure and adapted for carrying at least one irrigation hose, said reel having a receiving zone for receiving irrigation hose, said reel being for rotation in a winding up direction for winding up an irrigation hose about said receiving zone and for rotation in a paying out direction for paying out and irrigation hose therefrom;
   drive means associated with said reel for impart rotation to said reel;
   control means connected to said drive means for controlling said drive means;
   a traversable irrigation hose guide associated with said frame structure for allowing an irrigation hose to be wound laterally about said receiving zone of said reel in a substantially uniform manner;
   irrigation hose flattening means associated with said frame structure for contacting opposing sides of an irrigation hose for substantially flattening same as it is being wound onto said receiving zone of said reel; and
   means located on said reel outside of said receiving zone for maintaining the coupling ends of the irrigation hose away from said receiving zone to allow irrigation hose to be wound generally thereabout, said means including protection members connected to said reel for receiving the coupling ends of an irrigation hose.

9. An irrigation system for providing pressurized irrigation fluid to crops, the irrigation system comprising:
   irrigation conduit including a tube having a flexible wall defining an internal passage for carrying a pressurized irrigation fluid, said tube being pressurizable to a pressurized configuration, said wall of said tube defining a plurality of first pairs of diffuser opening, and a plurality of second pairs of diffuser openings, each of said pairs of diffuser openings being spaced from an adjacent pair and being offset in a circumferential direction relative thereto about said tube; said first and second pairs of diffuser openings in communication with said internal passage for emitting fluid therefrom;
   each of said first pair of diffuser openings being substantially diametrically opposed from one another and defining a first axis therebetween when said tube is in said pressurized configuration and each of said second pair of diffuser openings being substantially diametrically opposed from one another and defining a second axis therebetween when said tube is in said substantially pressurized configuration;and
   said first and second axes being angularly disposed with respect to one another about the circumference of said tube and relative to the central axis of said tube when said tube is in said substantially pressurized configuration;
   cooperating coupling ends attached to said tube about the end thereof, said coupling ends having generally cylindrical opening cooperating with said internal passage of said tube, said coupling ends allowing said tube to be connected in fluid communication with a pressurized irrigation fluid source and a pressurized irrigation fluid outlet;
   a mobile storage and dispensing device for said irrigation conduit, including:
   a frame structure;
   wheels rotatably mounted to said frame structure for allowing said frame structure to be moved about thereon;
   a reel rotatably mounted on said frame structure and adapted for carrying said irrigation conduit, said reel having a receiving zone for receiving said irrigation conduit, said reel being configured for rotation in a winding up direction for winding up said irrigation conduit about said receiving zone and for rotation in a paying out direction for paying out said irrigation hose therefrom;
   drive means associated with said reel for imparting rotation to said reel; and
   means located on said reel outside of said receiving zone for maintaining said coupling ends of said irrigation conduit away from said receiving zone to allow said irrigation conduit to be wound generally thereat, said coupling attachment means includes projection members connected to said reel for receiving the coupling ends of an irrigation hose.

10. An irrigation system as defined in claim 9, wherein said irrigation conduit is a coated fabric tube and wherein said first and second pairs of diffuser openings are drilled holes in said coated fabric wall of said tube and include frayed ends of said coated fabric wall extending into said first and second pairs of diffuser openings for diffusing pressurized irrigation fluid emitted therefrom.

11. An irrigation system as defined in claim 9, further comprising:
   a traversable irrigation conduit guide associated with said frame structure for allowing said irrigation conduit to be wound evenly about said receiving zone of said reel.

12. An irrigation system as defined in claim 9, away from said receiving zone includes projection members connected to said reel for receiving the generally cylindrical openings of said coupling ends of said irrigation conduit.

13. An irrigation system as defined in claim 9, further comprising:
   irrigation conduit flattening means associated with said frame structure for contacting opposing sides of an irrigation conduit for substantially flattening same as it is being wound onto said receiving zone of said reel.

14. A method of irrigating crops, comprising: providing as fabric irrigation tube having a pressurizable fluid passage;
- drilling at least one first pair of diametrically opposed diffuser openings into and in communication with said pressurized fluid passage of said fabric irrigation tube with a drill bit such that the fabric of said fabric irrigation tube frays at and extends into said first pair of diffuser opening for allowing pressurized fluid to be diffusedly emitted therethrough;
- drilling at least one second pair of diametrically opposed diffuser openings spaced from and substantially perpendicularly out of alignment with said first pair of diffuser opening into and in communication with said pressurized fluid passage of said fabric irrigation tube with a drill bit such that the fabric of said fabric irrigation tube frays at and extends into said second pair of diffuser openings for allowing pressurized fluid to be diffusedly emitted therethrough;
- connecting said internal passage of said fabric irrigation tube with a supply of pressurized irrigation water; and
- positioning said coated fabric irrigation tube such that said pairs of first and second diffuser openings emit oppositely angled streams of diffused irrigation fluid therefrom with respect to the ground, and further comprising;
- disconnecting said internal passage of said fabric irrigation tube from said supply of pressurized irrigation water after sufficient irrigation of the crops; and
- simultaneously removing irrigation water from and flattening said fabric irrigation tube after disconnection from said supply of pressurized irrigation water through contact with irrigation tube flattening means while winding up said fabric irrigation tube on a reel of a storage and dispensing device.

* * * * *